(12) United States Patent
Takiuchi et al.

(10) Patent No.: US 10,837,618 B2
(45) Date of Patent: Nov. 17, 2020

(54) VEHICULAR LAMP

(71) Applicant: STANLEY ELECTRIC CO., LTD., Tokyo (JP)

(72) Inventors: Dai Takiuchi, Tokyo (JP); Yasuhiro Nakamura, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/428,364

(22) Filed: May 31, 2019

(65) Prior Publication Data

US 2019/0368681 A1 Dec. 5, 2019

(30) Foreign Application Priority Data

Jun. 4, 2018 (JP) .................................. 2018-107193

(51) Int. Cl.
    *F21S 43/40* (2018.01)
    *F21S 43/31* (2018.01)
    *F21S 43/20* (2018.01)
    *F21V 5/04* (2006.01)

(52) U.S. Cl.
    CPC ............... *F21S 43/40* (2018.01); *F21S 43/26* (2018.01); *F21S 43/315* (2018.01); *F21V 5/04* (2013.01)

(58) Field of Classification Search
    None
    See application file for complete search history.

(56) References Cited

U.S. PATENT DOCUMENTS

| 2007/0127253 A1* | 6/2007 | Kawashima | F21S 41/155 362/509 |
| 2011/0216549 A1* | 9/2011 | Futami | B60Q 1/0041 362/516 |
| 2014/0071703 A1* | 3/2014 | Motomura | G02B 6/0033 362/511 |
| 2016/0116662 A1 | 4/2016 | Sato | |

(Continued)

FOREIGN PATENT DOCUMENTS

| DE | 102015115969 A1 | 4/2017 |
| EP | 2818791 A1 | 12/2014 |
| EP | 3168657 A1 | 5/2017 |

(Continued)

OTHER PUBLICATIONS

The extended European Search Report for the related European Patent Application No. 19178133.5 dated Oct. 11, 2019.

*Primary Examiner* — Britt D Hanley
(74) *Attorney, Agent, or Firm* — Kenealy Vaidya LLP

(57) ABSTRACT

A vehicular lamp includes: a lens body including front and rear surfaces; and a light source provided at the rear of the lens body and emitting light rays that enter through the rear surface and are outputted through the front surface. The front surface includes a plurality of lens cuts that control a diffusion angle of light rays, at least one lens cut includes a first region and a second region, the lens body includes a reflection surface that internally reflects a portion of light rays that are to be outputted through the second region, the first region is a surface that controls the diffusion angle of direct light rays that are to be outputted through the first region, and the second region is a surface that controls the diffusion angle of the reflected light rays from the reflection surface which are to be outputted through the second region.

15 Claims, 10 Drawing Sheets

(56) References Cited

U.S. PATENT DOCUMENTS

2017/0211771 A1* 7/2017 Nishimura .............. F21S 41/40

FOREIGN PATENT DOCUMENTS

| EP | 3168657 B1 * | 5/2017 | ......... G02B 19/0028 |
|---|---|---|---|
| JP | 2014-38733 A | 2/2014 | |
| JP | 2016-85827 A | 5/2016 | |
| KR | 1020150071410 A | 6/2015 | |
| WO | 2017/191954 A1 | 11/2017 | |

* cited by examiner

VEHICULAR LAMP

This application claims the priority benefit under 35 U.S.C. § 119 of Japanese Patent Application No. 2018-107193 filed on Jun. 4, 2018, which is hereby incorporated in its entirety by reference.

TECHNICAL FIELD

The presently disclosed subject matter relates to a vehicular lamp, and more particularly, to a vehicular lamp capable of outputting light rays uniformly from a front surface of a lens body while being capable of suppressing the decrease in luminous appearance.

BACKGROUND ART

FIG. 10A is a side view of a conventional vehicular lamp 120, and FIG. 10B is a front view of a rear surface 101 (and a front surface 102) thereof.

Conventionally, as shown in FIG. 10A, a known vehicular lamp 120 includes an inner lens 100, and a light source 110 disposed behind the inner lens 100. The light source 110 emits light rays Ray that enter the inner lens 100 through the rear surface 101 thereof, and are outputted through the front surface 102 thereof to be irradiated forward to form a predetermined light distribution pattern. Examples of such a vehicular lamp may include those disclosed in Japanese Patent Application Laid-Open No 2016-085827 (corresponding U.S. case: US2016116662A1).

In the vehicular lamp disclosed in this publication, the inner lens 100 is formed in a flat plate shape, and the rear surface 101 and the front surface 102 of the inner lens 100 are linearly formed as shown in FIG. 10B.

In the vehicular lamp disclosed in this publication, the light rays emitted from the light source 110 enter the inner lens 100 through the rear surface 101 and are outputted through the front surface 102 while being controlled in terms of direction by a plurality of lens cuts provided to the front surface 102.

In the vehicular lamp disclosed in this publication as shown in FIG. 10, however, the light rays from the light source 110 that are to be outputted through the areas surrounded by the circles E in the front surface 102 are attenuated and have a relatively low intensity because the distance (optical path length) the light rays travel in the lens body 120 is longer than that the light rays from the light source 30 that are to be outputted through the areas of the front surface 102 other than the areas E travel. As a result, the areas of the front surface 102 surrounded by the circles E becomes relatively dark, and thus, the lens body 120 (front surface 102 thereof) cannot output light uniformly (or have decreased luminous appearance.

SUMMARY

The presently disclosed subject matter has been made in view of the above circumstances, and an object thereof is to provide a vehicular lamp capable of outputting light rays uniformly from a front surface of a lens body while being capable of suppressing the decrease in luminous appearance.

According to an aspect of the presently disclosed subject matter, there is provided a vehicular lamp comprising: a lens body including a front surface and a rear surface on the opposite side thereof; and a light source provided at the rear of the lens body and emitting light rays that are to enter the lens body through the rear surface and to be outputted through the front surface, in which the front surface includes a plurality of lens cuts configured to control a diffusion angle of light rays from the light source that are to be outputted through the front surface, at least one lens cut of the plurality of lens cuts includes a first region and a second region, the lens body includes a reflection surface that internally reflects at least a portion of light rays from the light source that have entered the lens body through the rear surface so as to be outputted through the second region, the first region is a surface configured to control the diffusion angle of direct light rays from the light source that have entered the lens body through the rear surface to be outputted through the first region, and the second region is a surface configured to control the diffusion angle of the reflected light rays from the reflection surface which are to be outputted through the second region.

According to this aspect, it is possible to provide a vehicular lamp capable of outputting light rays uniformly from a front surface of a lens body while being capable of suppressing the decrease in luminous appearance.

This is because not only the direct light rays from the light source but also the reflected light rays from the reflection surface are outputted through the respective lens cuts, so that the loss of light is suppressed and the light intensity is increased.

In the aforementioned presently disclosed subject matter, a preferable aspect is configured such that the lens cut including the first region and the second region is provided in an area of the front surface through which light rays from the light source which travel relatively long in the lens body are outputted.

BRIEF DESCRIPTION OF DRAWINGS

These and other characteristics, features, and advantages of the presently disclosed subject matter will become clear from the following description with reference to the accompanying drawings, wherein:

FIGS. 8A, 8B, 8C, and 8D include diagrams illustrating modifications of the front surface 20a;

FIG. 9 is a diagram illustrating a further modification of the front surface 20a;

DESCRIPTION OF EXEMPLARY EMBODIMENTS

Figure 1:
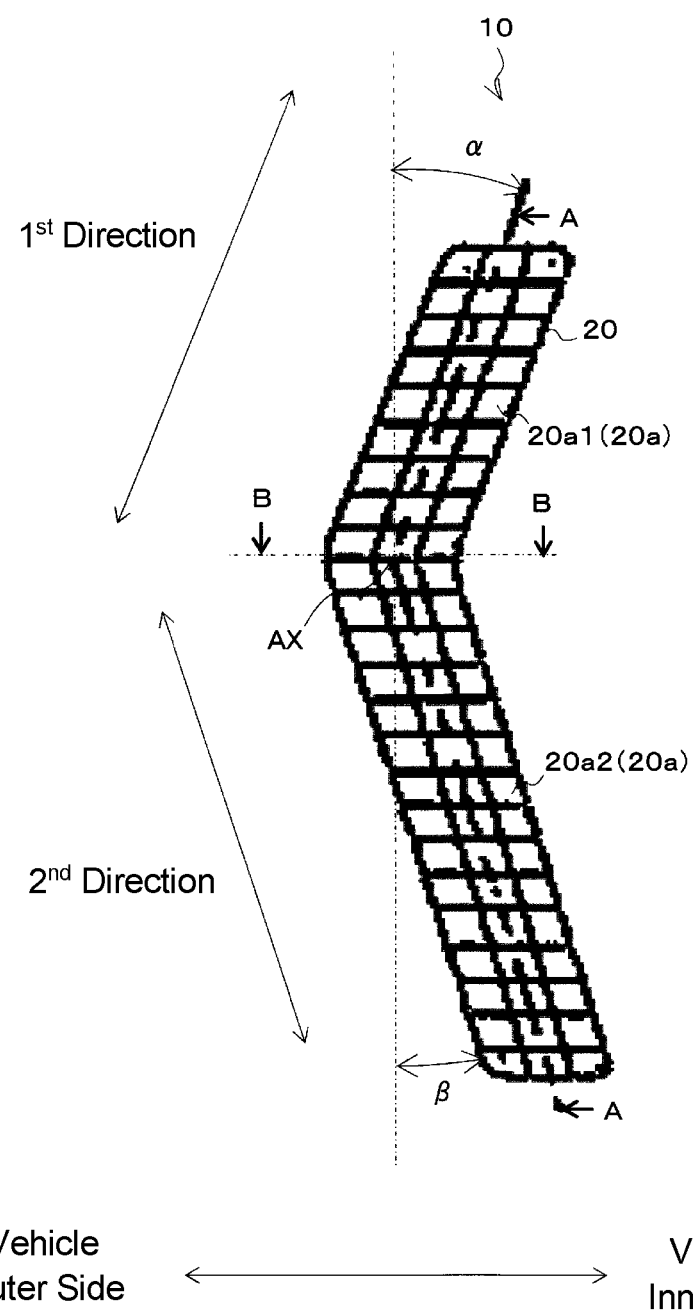
FIG. 1 is a front view of a vehicular lamp 10 made in accordance with principles of the presently disclosed subject matter.

Hereinafter, a vehicular lamp 10 according to an exemplary embodiment of the presently disclosed subject matter will be described with reference to the accompanying drawings. Components corresponding to each other in the drawings are denoted by the same reference numerals, and a repetitive description thereof is omitted.

Figure 2:
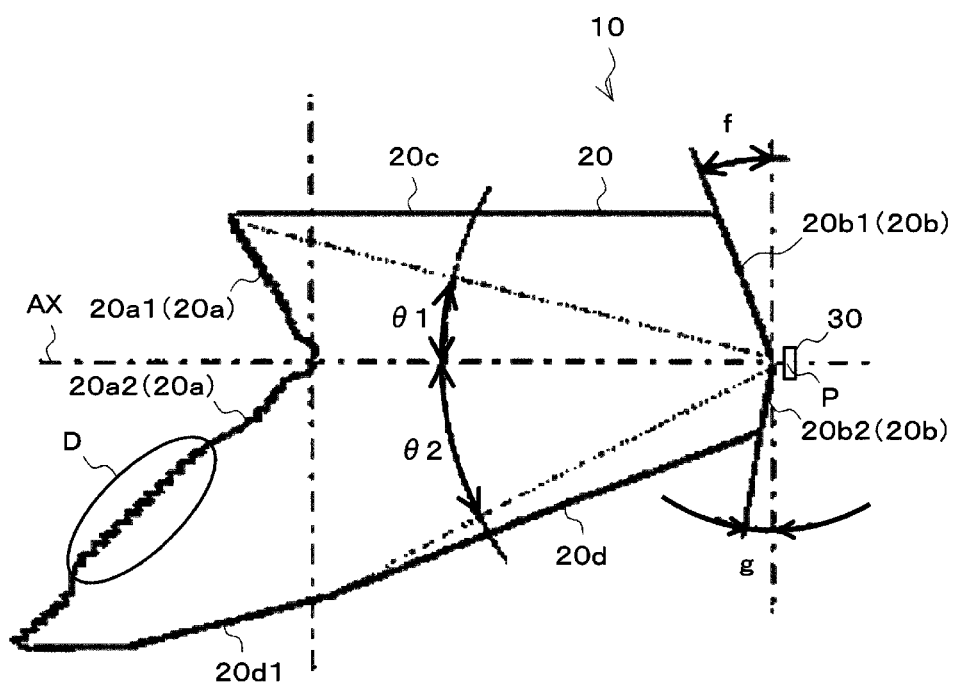
FIG. 2 is a cross-sectional view of the vehicular lamp 10 shown in FIG. 1 taken along line A-A.
Figure 3:
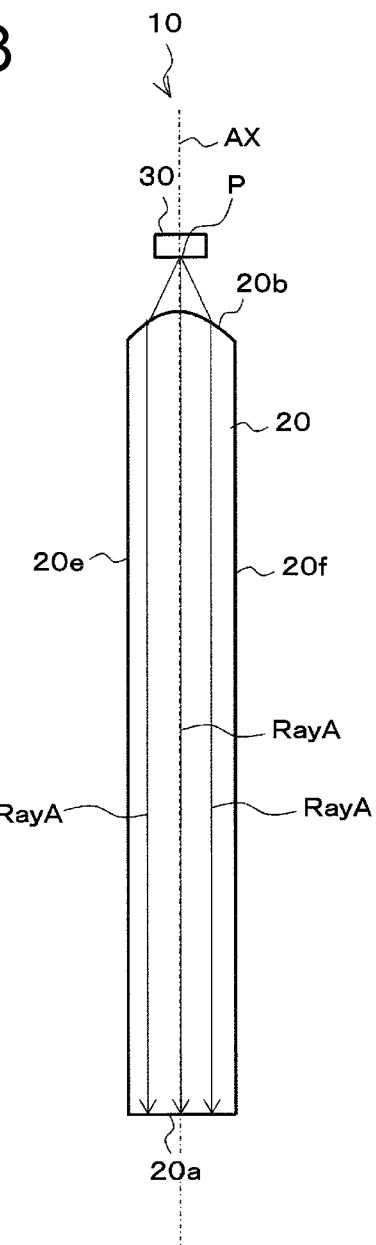
FIG. 3 is a cross-sectional view of the vehicular lamp 10 shown in FIG. 1 taken along line B-B.

FIG. 1 is a front view of a vehicular lamp 10, FIG. 2 is a cross-sectional view taken along line A-A of the vehicular lamp 10 shown in FIG. 1, and FIG. 3 is a cross-sectional view taken along line B-B.

The vehicular lamp 10 shown in FIGS. 1 to 3 is a sign lamp (or signal lamp) functioning as a DRL lamp, and is mounted on both left and right sides of a front end portion of a vehicle such as an automobile. Since the vehicular lamp 10 mounted on both the left and right sides has a symmetrical configuration, the vehicular lamp 10 mounted on the right side of the front end of the vehicle, i.e., the right side toward the front of the vehicle, will be described below as a representative.

The vehicular lamp 10 includes a plate-like lens body 20 including a front surface 20a and a rear surface 20b on the opposite side thereof, and a light source 30 disposed at the rear of the lens body 20, which emits light rays that are to enter the lens body 20 through the rear surface 20b, and be outputted through the front surface 20a, whereby light rays are irradiated forward to form a DRL light distribution pattern, for example. Although not shown, the vehicular lamp 10 is disposed in a lamp chamber formed by an outer lens and a housing, and is attached to the housing or the like.

The light source 30 is a semiconductor light-emitting element such as an LED or LD having a rectangular (for example, 1 mm square) light-emitting surface. The light source 30 is mounted on a substrate (not shown) with the light-emitting surface facing forward (front). The substrate is attached to the housing (not shown) or the like by screwing or the like. The light source 30 has an optical axis that coincides with a reference axis AX (also referred to as an optical axis; see FIG. 2) extending in the front-rear direction of the vehicle. The light source 30 is disposed in the vicinity of a reference point P in the optical design of the lens body 20. As shown in FIG. 2 and FIG. 3, the position where the top portion of the rear surface 20b opposes is the reference point P in the optical design of the lens body 20.

The lens body 20 is a plate-shaped lens body including the front surface 20a, the rear surface 20b, an upper surface 20c, a lower surface 20d, a right side surface 20e, and a left side surface 20f, and is, for example, an inner lens.

The lens body 20 is made of a transparent resin such as an acrylic resin or a polycarbonate resin, and is molded by injection molding. The basic thickness of the lens body 20 is, for example, 6 to 7 mm.

As shown in FIG. 1, the front surface 20a includes a first light-outputting surface 20a1 that linearly extends in a first direction inclined by an angle α with respect to a vertical line in a front view and a second light-outputting surface 20a2 that linearly extends in a second direction inclined by an angle β with respect to the vertical line in a front view, from the viewpoint of enhancing the design property, and is configured to have a shape bent in a slanted "L" shape as a whole. The first light-outputting surface 20a1 is disposed above the reference axis AX, while the second light-outputting surface 20a2 is disposed below the reference axis AX.

As shown in FIG. 2, the front surface 20a (including the first light-outputting surface 20a1 and the second light-outputting surface 20a2) is disposed in a state of being opened in a V shape toward the front as seen in a side view (or a cross-sectional view A-A). The second light-outputting surface 20a2 extends more forward and downward than the distal end portion of the first light-outputting surface 20a1. As the angles α, β, and V-shaped opening angle, appropriate values are adopted in consideration of the design property.

Figure 4:
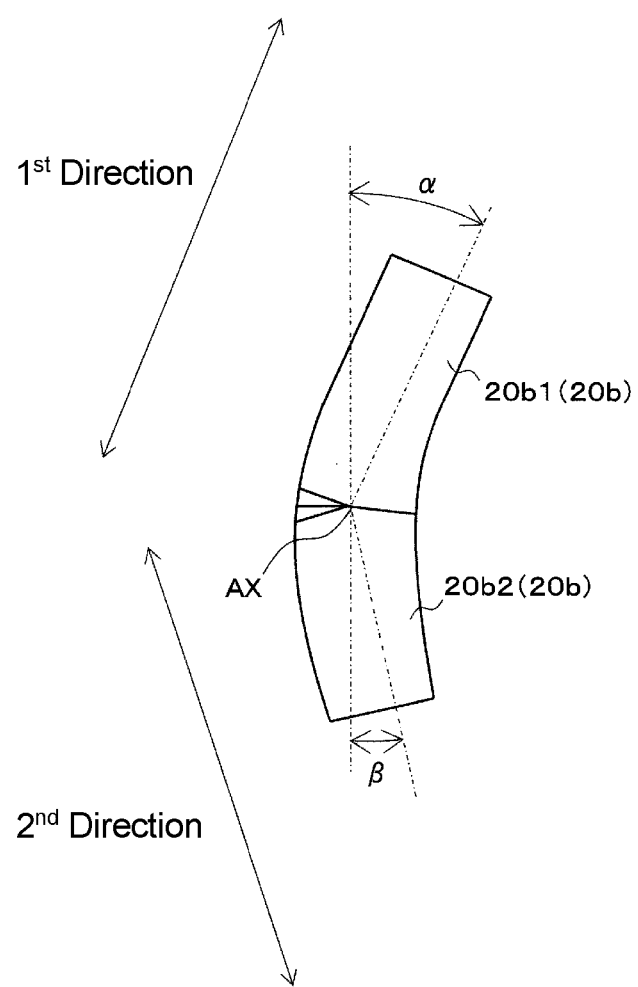
FIG. 4 is a front view of a rear surface 20b.

FIG. 4 is a front view of the rear surface 20b.

As shown in FIG. 4, similar to the front surface 20a shown in FIG. 1, the rear surface 20b includes a first light-entering surface 20b1 that linearly extend in the first direction inclined by the angle α with respect to the vertical line in a front view, and a second light-entering surface 20b2 that linearly extends in the second direction inclined by the angle β with respect to the vertical line in a front view, and is configured to have a shape bent in a slanted "L" shape as a whole. The first light-entering surface 20b1 is disposed above the reference axis AX, and the second light-entering surface 20b2 is disposed below the reference axis AX.

As shown in FIG. 3, the horizontal cross-sectional shape of the rear surface 20b is configured such that light rays RayA (e.g., light rays within a half-value angle) from the light source 30 (e.g., the reference point P in the optical design of the lens body 20) entering the lens body 20 through the rear surface 20b are condensed in the thickness direction (the left-right direction in FIG. 3) of the lens body 20 and become light rays parallel to the right and left side surfaces 20e and 20f of the lens body 20.

As shown in FIG. 2, the rear surface 20b (including the first light-entering surface 20b1 and the second light-entering surface 20b2) is disposed in a state of being opened in a V shape toward the front as seen in a side view (or a cross-sectional view A-A).

Specifically, the inclination angle f of the first light-entering surface 20b1 with respect to the vertical line is adjusted so that light rays from the light source 30 that have entered the lens body 20 through the first light-entering surface 20b1 (for example, light rays within the half-value angle) mainly travel within a range of the angle θ1 and are outputted through the entire area of the first light-outputting surface 20a1.

On the other hand, the inclination angle g of the second light-entering surface 20b2 with respect to the vertical line is adjusted so that light rays from the light source 30 that have entered the lens body 20 through the second light-entering surface 20b2 (for example, light rays within the half-value angle) mainly travel within a range of the angle θ2 and are outputted through the entire area of the second light-outputting surface 20a2.

The first light-entering surface 20b1 is configured to have the same length as that of the first light-outputting surface 20a1 as seen in a side view (or A-A cross-sectional view). On the other hand, the second light-entering surface 20b2 is configured to be shorter than the second light-outputting surface 20a2 as seen in a side view (or A-A cross-sectional view) in consideration of the layout property.

The light rays RayA from the light source 30 that have entered the lens body 20 through the rear surface 20b (including the first light-entering surface 20b1 and the second light-entering surface 20b2) directly travel toward the front surface 20 (including the first light-outputting surface 20a1 and the second light-outputting surface 20a2).

This is because rear surface 20b is configured to have a shape (a shape that is bent in a slanted "L" shape as a whole) including the first light-entering surface 20b1 and the second light-entering surface 20b2 extending in the respective same directions (first direction and second direction) as those in the front surface 20a. In addition to this, the intermediate cross-sectional shape (a cross-sectional shape in a plane orthogonal to the reference axis AX) between the rear surface 20b and the front surface 20a of the lens body 20 is also configured to have a shape (a shape that is bent in a slanted "U" shape as a whole) including the first cross-sectional shape and the second cross-sectional shape extending in the respective same directions (first direction and second direction) as those in the front surface 20a.

Figure 5:
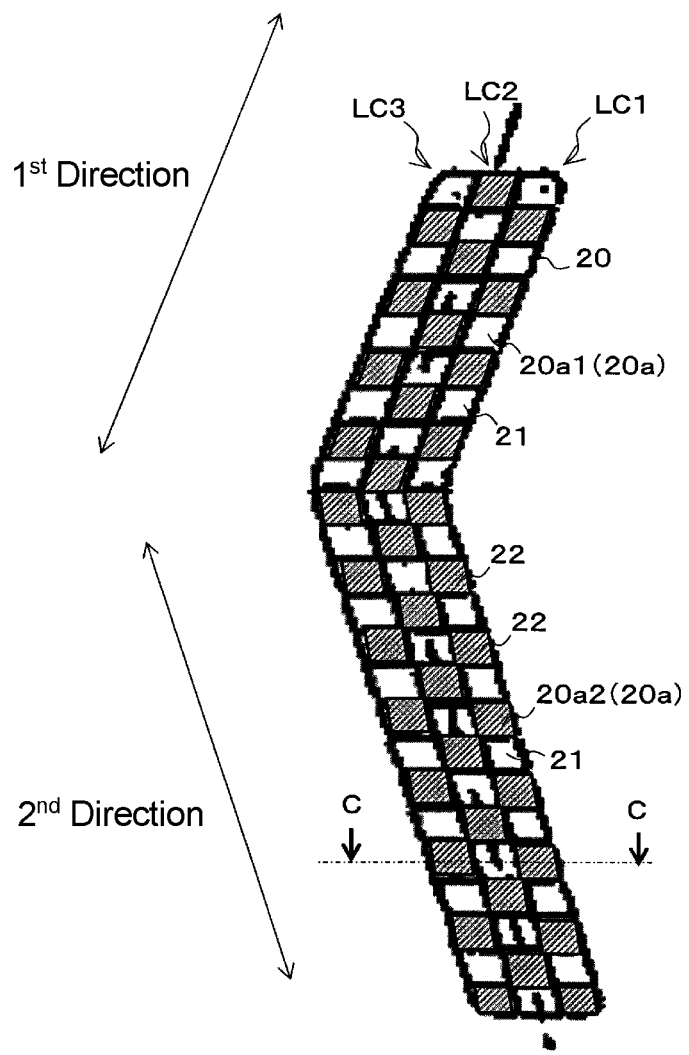
FIG. 5 is a diagram for describing lens cut rows LC1 to LC3.
Figure 6:
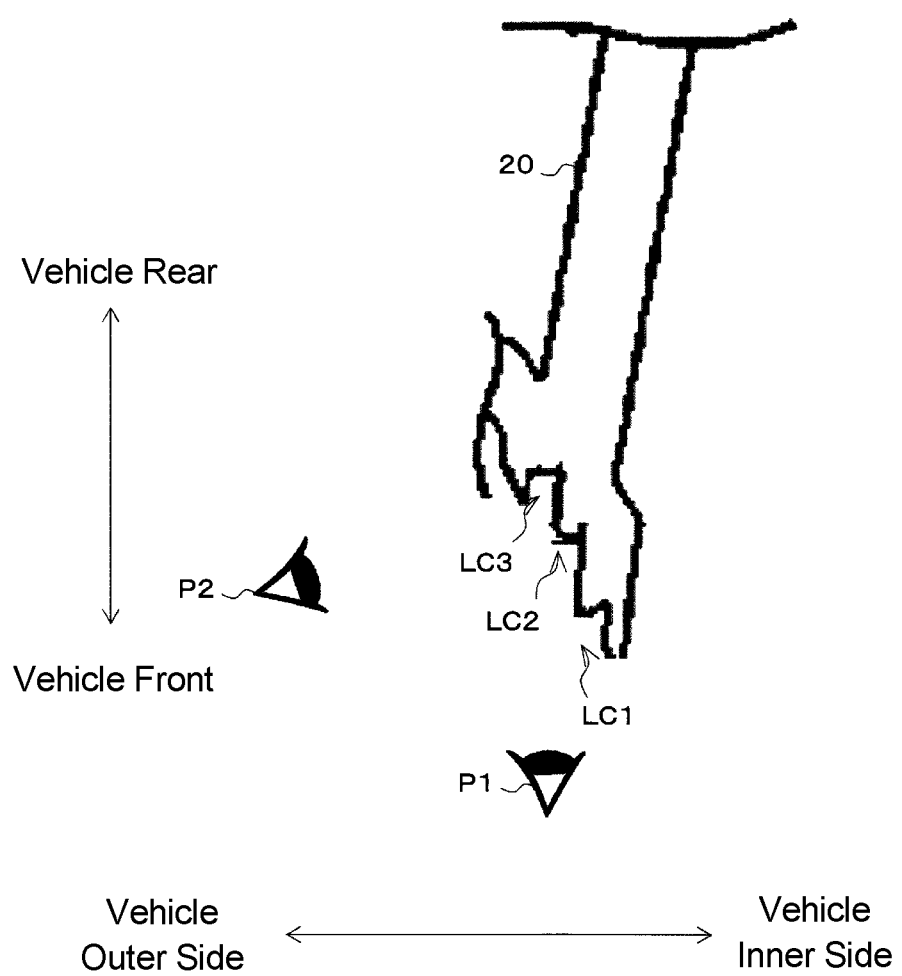
FIG. 6 is a cross-sectional view of FIG. 5 taken along line C-C.

FIG. 5 is a diagram for describing the lens cut rows LC1 to LC3. FIG. 6 is a cross-sectional view taken along line C-C of FIG. 5.

As shown in FIG. 5, the front surface 20a includes a plurality of lens cut rows LC1 to LC3. Each of the lens cut rows LC1 to LC3 is composed of a plurality of first lens cuts 21 and a plurality of second lens cuts 22. In the front surface 20a shown in FIG. 5, an open rectangular region represents the first lens cut 21, while a hatched rectangular region represents the second lens cut 22.

As shown in FIG. 5, the first lens cuts 21 and the second lens cuts 22 are alternately arranged in a checkered pattern so that the same type lens cuts (21 or 22) are not adjacent to each other.

As shown in FIG. 6, the lens cut row among the lens cut rows LC1 to LC3 on the more inner side of the vehicle is arranged more forward. Specifically, the lens cut row LC1 is arranged at the foremost, the lens cut row LC2 is arranged at the rear of the lens cut row LC1, and the lens cut row LC3 is arranged at the rear of the lens cut row LC2 (at the rearmost).

Each of the first lens cuts 21 and the second lens cuts 22 is a diffusion surface configured to diffuse light from the light source 30 outputted through the first lens cut 21 or the second lens cut 22, and is, for example, a convex lens surface (R surface) convex toward the front of the vehicle.

Specifically, the first lens cut 21 is a convex lens surface (in which the respective curvatures of the longitudinal section and the transverse section are set), for example, configured to diffuse the light rays, which have been emitted from the light source 30 and outputted through the first lens cut 21, in the vertical direction by a first angle (e.g., up and down by 10 degrees) and diffuse the light rays in the horizontal direction by a second angle (e.g., left and right by 10 degrees).

On the other hand, the second lens cut 22 is a convex lens surface (in which the respective curvatures of the longitudinal section and the transverse section are set), for example, configured to diffuse the light rays, which have been emitted from the light source 30 and outputted through the second lens cut 22, in the vertical direction by a third angle (e.g., up and down by 5 degrees) that is smaller than the first angle, and diffuse the light rays in the horizontal direction by a fourth angle (e.g., left and right by 20 degrees) that is larger than the second angle.

Figure 7:
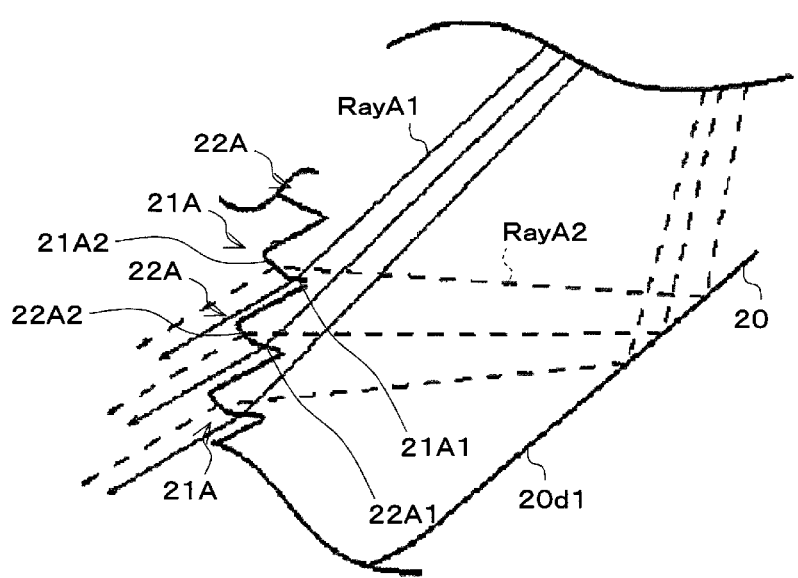
FIG. 7 is an enlarged view of a part of an area surrounded by an ellipse D shown in FIG. 2.

FIG. 7 is a partially enlarged view of a region surrounded by the ellipse D shown in FIG. 2.

The light rays from the light source 30 that are to be outputted through the area surrounded by the ellipse D in the front surface 20a are attenuated and thus have a relatively low intensity because the distance (optical path length) the light rays travel in the lens body 20 is longer than that the light rays from the light source 30 that are to be outputted through the areas of the front surface 20a other than the area surrounded by the ellipse D travel. As a result, the area of the front surface 20a surrounded by the ellipse D becomes relatively dark.

Hereinafter, a configuration for brightening the area of the front surface 20a surrounded by the ellipse D will be described.

As shown in FIG. 7, a plurality of first lens cuts 21A and a plurality of second lens cuts 22A are provided instead of the first lens cuts 21 and the second lens cuts 22 in the area of the front surface 20a surrounded by the ellipse D. Although not specifically shown, the first lens cuts 21A and the second lens cuts 22A are alternately arranged in a checkered pattern so that the same type lens cuts are not adjacent to each other, similarly to the first lens cuts 21 and the second lens cuts 22.

The first lens cut 21A includes a first region 21A1 and a second region 21A2.

The lower surface 20d of the lens body 20 includes a reflection surface 20d1 that internally reflects at least a part of the light rays from the light source 30 that have entered the lens body 20 through the rear surface 20b so as to be outputted through the second region 21A2 (and a fourth region 22A2, which will be described later).

The first region 21A1 is a surface configured to control the diffusion angle of the direct light rays RayA1 from the light source 30 that have entered the lens body 20 through the rear surface 20b to be outputted through the first region 21A1.

Specifically, the first region 21A1 is configured to diffuse the light rays RayA1 (direct light) from the light source 30, which are to be outputted through the first region 21A1, in the vertical direction by a first angle (e.g., up and down by 10 degrees) and diffuse the light rays in the horizontal direction by a second angle (e.g., left and right by 10 degrees).

The second region 21A2 is a surface configured to control the diffusion angle of the reflected light rays RayA2 from the reflection surface 20d1 that are to be outputted through the second region 21A2.

Specifically, similarly to the first region 21A1, the second region 21A2 is configured to diffuse the light rays RayA2 (reflected light) from the reflection surface 20d1, which are to be outputted through the second region 21A2, in the vertical direction by a first angle (e.g., up and down by 10 degrees) and diffuse the light rays in the horizontal direction by a second angle (e.g., left and right by 10 degrees).

As shown in FIG. 7, the second lens cut 22A includes a third region 22A1 and a fourth region 22A2.

The third region 22A1 is a surface configured to control the diffusion angle of the direct light rays RayA1 from the light source 30 that have entered the lens body 20 through the rear surface 20b to be outputted through the third region 22A1.

Specifically, the third region 22A1 is configured to diffuse the light rays RayA1 (direct light) from the light source 30, which are to be outputted through the third region 22A1, in the vertical direction by a third angle (e.g., up and down by 5 degrees) smaller than the first angle, and to diffuse the light rays in the horizontal direction by a fourth angle (e.g., left and right by 20 degrees) larger than the second angle.

The fourth region 22A2 is a surface configured to control the diffusion angle of the reflected light rays RayA2 from the reflection surface 20d1 that are to be outputted through the fourth region 22A2.

Specifically, like the third region 22A1, the fourth region 22A2 is configured to diffuse the light rays RayA2 (reflected light) from the reflection surface 20d1, which are to be outputted through the fourth region 22A2, in the vertical direction by a third angle (e.g., up and down by 5 degrees) smaller than the first angle, and diffuse the light rays in the horizontal direction by a fourth angle (e.g., left and right by 20 degrees) larger than the second angle.

As described above, by configuring and arranging the first lens cuts 21A and the second lens cuts 22A in these manners, respectively, the area surrounded by the ellipse D can be made brighter as compared with the case where the first lens cuts 21 and the second lens cuts 22 are adopted. This means that the front surface 20a of the lens body 20 can be caused to output light uniformly.

This is because not only the direct light rays RayA1 from the light source 30 but also the reflected light rays RayA2 from the reflection surface 20*d*1 are outputted through the respective lens cuts 21A and lens cuts 22A, so that the loss of light is suppressed and the light intensity is increased.

When the light source 30 is turned on in the vehicular lamp 10 having the above-described configuration, the light rays RayA from the light source 30 enter the lens body 20 through the rear surface 20*b* of the lens body 20 while being refracted by the rear surface 20*b*. Then, the light rays RayA are condensed in the thickness direction of the lens body 20, travel in the lens body 20 as light rays parallel to the left and right side surfaces 20*e* and 20*f* of the lens body 20, and are outputted through the front surface 20*a*.

Specifically, the light rays from the light source 30 that have entered the lens body 20 through the first light-entering surface 20*b*1 of the rear surface 20*b* of the lens body 20 while being refracted by the same mainly travel in the range of the angle $\theta1$ in the lens body 20 (see FIG. 2), and are outputted through the entire area of the first light-outputting surface 20*a*1 of the front surface 20*a* of the lens body 20.

At that time, the light rays from the light source 30 that are to be outputted through the entire area of the first light-outputting surface 20*a*1 are diffused up, down, left, and right by the action of the first lens cuts 21 and the second lens cuts 22 provided on the first light-outputting surface 20*a*1.

On the other hand, the light rays from the light source 30 that have entered the lens body 20 through the second light-entering surface 20*b*2 of the rear surface 20*b* of the lens body 20 while being refracted by the same mainly travel in the range of the angle $\theta2$ in the lens body 20 (see FIG. 2), and are outputted through the entire area of the second light-outputting surface 20*a* of the front surface 20*a* of the lens body 20.

At that time, the light rays from the light source 30 (direct light rays and reflected light rays from the reflecting surface 20*d*1) that are to be outputted through the entire area of the second light-outputting surface 20*a*2 are diffused up, down, left, and right by the action of the first lens cuts 21 and the second lens cuts 22 (and the first lens cuts 21A and the second lens cuts 22A) provided on the second light-outputting surface 20*a*2.

Specifically, the light rays from the light source 30 diffused up, down, left, and right by the action of the plurality of first lens cuts 21 (and the first lens cuts 21A) are irradiated onto the same region (e.g., a region of up and down 10 degrees and left and right 10 degrees) on the virtual vertical screen (disposed about 25 m forward from the rear surface of the vehicle). The light rays from the light source 30 diffused up, down, left, and right by the action of the plurality of second lens cuts 22 (and the second lens cuts 22A) are irradiated onto the same region (for example, a region of up and down 5 degrees and left and right 20 degrees) on the virtual vertical screen. As a result, a DRL light distribution pattern (not shown) can be formed.

As described above, according to the present exemplary embodiment, it is possible to provide the vehicular lamp 10 capable of outputting light rays uniformly from the front surface 20*a* of the lens body 20 while being capable of suppressing the decrease in luminous appearance.

This is because not only the direct light rays RayA1 from the light source 30 but also the reflected light rays RayA2 from the reflection surface 20*d*1 are outputted through the respective first lens cuts 21A and second lens cuts 22A, so that the loss of light is suppressed and the light intensity is increased.

Further, according to the present exemplary embodiment, it is possible to suppress the occurrence of the loss of light rays from the light source 30 which have entered the lens body 20.

This is because the rear surface 20*b* is configured to have the shape including the first light-entering surface 20*b*1 and the second light-entering surface 20*b*2 extending in the respective same directions (the first direction and second direction) as those in the front surface 20*a* (a shape that is bent in a slanted "L" shape as a whole). In addition to this, this is because the intermediate cross-sectional shape (a cross-sectional shape appearing in a plane orthogonal to the reference axis AX) between the rear surface 20*b* and the front surface 20*a* of the lens body 20 is also configured in a shape (a shape that is bent in a slanted "L" shape as a whole) including the first cross-sectional shape and the second cross-sectional shape extending in the respective same directions (first direction and second direction) as those in the front surface 20*a*, although not illustrated.

That is, since the rear surface 20*b* (and the intermediate cross-sectional shape) is configured to have a shape that includes the first light-entering surface 20*b*1 and the second light-entering surface 20*b*2 (and the first cross-sectional shape and the second cross-sectional shape) that extend in the respective same directions as those in the front surface 20*a*, light rays from the light source 30 that have entered the lens body 20 through the rear surface 20*b* directly travel toward the first light-outputting surface 20*a*1 and the second light-outputting surface 20*a*2. As a result, the light rays are outputted through the front surface 20*a* (including the first light-outputting surface 20*a*1 and the second light-outputting surface 20*a*2) without leaking (substantially without leaking) out of the lens body 20 from the right side surface 20*e* or the left side surface 20*f* of the lens body 20.

In addition, according to the present exemplary embodiment, it is possible to provide the vehicular lamp 10 in which the lens body 20 (the front surface 20*a*) outputs light uniformly. Note that the term "uniform" herein is not limited to the meaning of "uniform" in a strict sense. That is, it is "uniform" as long as it can be evaluated that the light rays outputted are visually observed as being uniform.

This is because firstly, the inclination angle f of the first light-entering surface 20*b*1 with respect to the vertical line is adjusted so that the light rays from the light source 30 having entered the lens body 20 through the first light-entering surface 20*b*1 travel mainly within the angle $\theta1$ so as to be outputted through the entire area of the first light-outputting surface 20*a*1, and secondly, the inclination angle g of the second light-entering surface 20*b*2 with respect to the vertical line is adjusted so that the light rays from the light source 30 having entered the lens body 20 through the second light-entering surface 20*b*2 travel mainly within the angle $\theta2$ so as to be outputted through the entire area of the second light-outputting surface 20*a*2 (see FIG. 2).

Further, according to the present exemplary embodiment, even if the line-of-sight position moves, the light emission appearance can be made similar.

This is because the first lens cuts 21 and the second lens cuts 22 having different diffusion angles are alternately arranged in a checkered pattern so that the same type lens cuts are not adjacent to each other (see FIG. 5).

Further, according to the present exemplary embodiment, not only the luminous appearance as seen from the front of the vehicle but also the luminous appearance as seen from the side surface of the vehicle, for example, the left side surface, can be made favorable.

This is because of the fact that the lens cut row on the more inner side of the vehicle among the lens cut rows LC1 to LC3 is disposed more forward. More specifically, this is because the lens cut row LC1 is disposed at the foremost position, the lens cut row LC2 is disposed at the rear of the lens cut row LC1, and the lens cut row LC3 is disposed at the rear (rearmost position) of the lens cut row LC2 (see FIG. 6).

As described above, according to the present exemplary embodiment, it is possible to provide the vehicular lamp 10 having high light utilization efficiency and good luminous appearance.

Next, a modified example will be described.

In the above-described exemplary embodiment, the example in which the vehicular lamp of the presently disclosed subject matter is applied to a DRL lamp has been described, but the presently disclosed subject matter is not limited thereto. For example, the vehicular lamp of the presently disclosed subject matter may be applied to a vehicular lamp other than a DRL lamp, for example, a turn signal lamp, a positioning lamp, a tail lamp, a stop lamp, or a fog lamp.

Further, in the above-described exemplary embodiment, the example has been described in which the front surface 20a used includes the first light-outputting surface 20a1 linearly extending in the first direction in the front view and the second light-outputting surface 20a2 linearly extending in the second direction in the front view and as a result, is configured to have a shape bent into a slanted "L" shape as a whole, but the presently disclosed subject matter is not limited thereto.

FIGS. 8A-D show modifications of the front surface 20a.

Figure 8A:
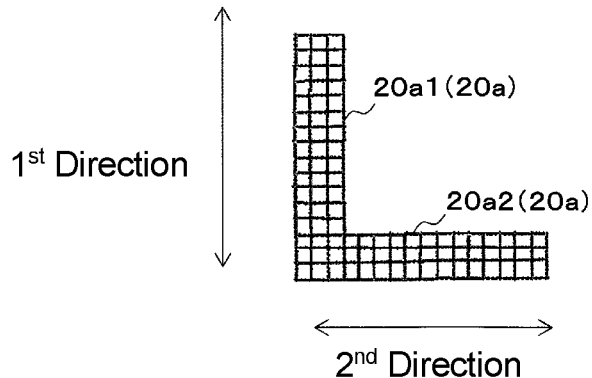

For example, as shown in FIG. 8A, a front surface 20a including a first light-outputting surface 20a1 linearly extending in a first direction in a front view and a second light-outputting surface 20a2 linearly extending in a second direction in a front view to be configured to have a shape bent into an "L" shape as a whole may be used.

Figure 8B:
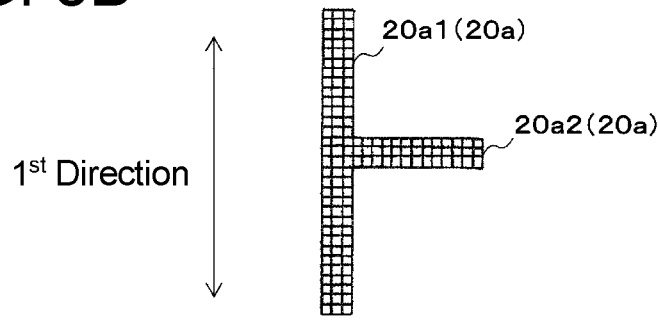

Further, for example, as shown in FIG. 8B, a front surface 20a including a first light-outputting surface 20a1 linearly extending in a first direction in a front view and a second light-outputting surface 20a2 linearly extending in a second direction in a front view to be configured to have a shape bent into a "T" shape lying sideways as a whole may be used.

Figure 8C:
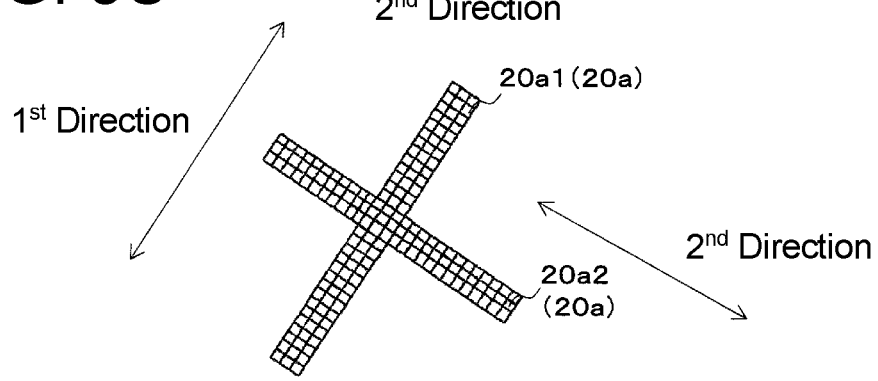

Further, for example, as shown in FIG. 8C, a front surface 20a including a first light-outputting surface 20a1 linearly extending in a first direction in a front view and a second light-outputting surface 20a2 linearly extending in a second direction in a front view to be configured to have a shape bent into an "X" shape as a whole may be used.

Figure 8D:
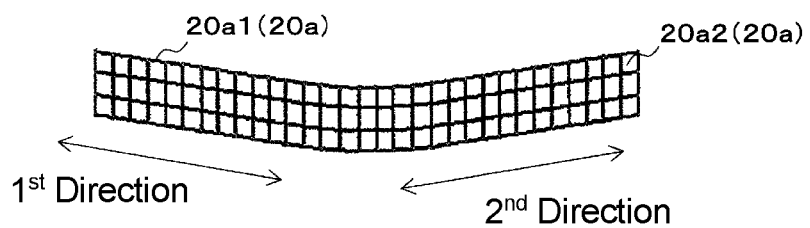

Further, for example, as shown in FIG. 8D, a front surface 20a including a first light-outputting surface 20a1 linearly extending in a first direction in a front view and a second light-outputting surface 20a2 linearly extending in a second direction in a front view to be configured to have a shape bent into a "V" shape as a whole may be used.

In the cases shown in FIGS. 8A-D, similarly to the above-described exemplary embodiment, although not shown, the rear surface 20b is configured to have a shape including the first light-entering surface 20b1 and the second light-entering surface 20b2 extending in the respective same directions as those in the front surface 20a (the first direction and the second direction), and the intermediate cross-sectional shape between the rear surface 20b and the front surface 20a of the lens body 20 (the cross-sectional shape in a plane orthogonal to the reference axis AX) is also configured to have a shape including the first cross-sectional shape and the second cross-sectional shape extending in the respective same directions as those in the front surface 20a (the first direction and the second direction). As a result, the same effects as those of the above-described exemplary embodiment can be achieved.

Figure 9:
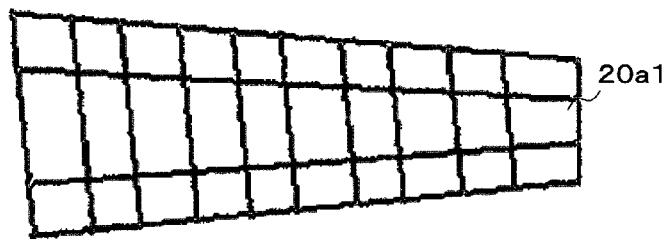
Figure 10A:
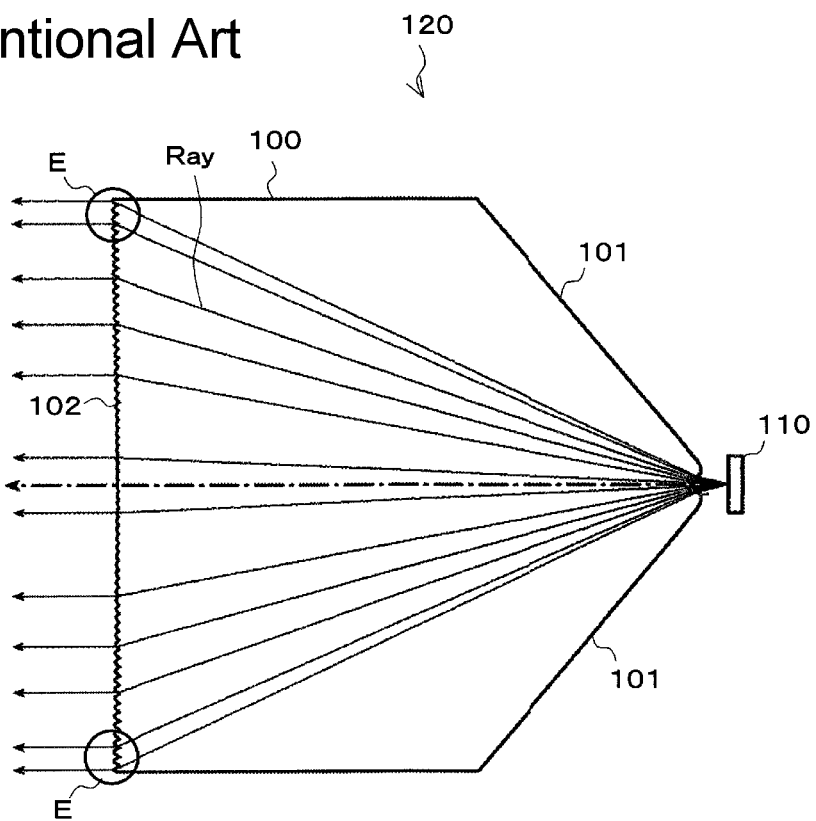
FIG. 10A is a side view of a conventional vehicular lamp 120.
Figure 10B:
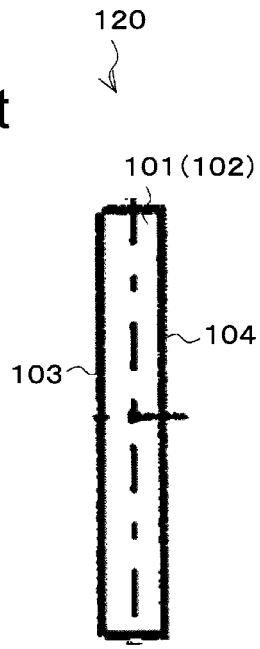
FIG. 10B is a front view of a rear surface 101 (and a front surface 102)

Furthermore, for example, a lens body 20 may be used as shown in FIG. 9 in which each of the front surface 20a, the rear surface 20b, and the intermediate cross-sectional shape has a trapezoid.

Furthermore, for example, a lens body 20 may be used in which each of the front surface 20a, the rear surface 20b, and the intermediate cross-sectional shape has a linear shape like that in the conventional vehicular lamp.

In the above-described exemplary embodiment, the example in which two types of lens cuts having mutually different diffusion angles (the first lens cut 21 and the second lens cut 22) are used as the lens cuts has been described, but the presently disclosed subject matter is not limited thereto. For example, three or more types of lens cuts having mutually different diffusion angles may be used as the lens cuts according to the intended use application.

In the above-described exemplary embodiment, the example has been described in which the first light-outputting surface 20a1 and the second light-outputting surface 20a2 arranged in a V-shaped open state toward the front in a side view (or A-A cross-sectional view) are used as the front surface, but the presently disclosed subject matter is not limited thereto. For example, a plane orthogonal to the reference axis AX, a curved surface, or another designed surface may be used as the front surface according to the intended use application.

All of the numerical values shown in the above-described exemplary embodiments are exemplified, and it is needless to say that an appropriate numerical value different from this can be used.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicular lamp comprising:
   a lens body including a front surface and a rear surface on the opposite side thereof; and
   a light source provided at the rear of the lens body and emitting light rays that are to enter the lens body through the rear surface and to be outputted through the front surface, wherein
   the front surface includes a plurality of lens cuts configured to control a diffusion angle of light rays from the light source that are to be outputted through the front surface,
   at least one lens cut of the plurality of lens cuts includes a first region and a second region,
   the lens body includes a reflection surface that internally reflects at least a portion of light rays from the light source that have entered the lens body through the rear surface so as to be outputted through the second region,
   the first region is configured to control a diffusion angle of substantially all direct light rays from the light source that have entered the lens body through the rear surface to be outputted through the first region, and the second region is configured to control the diffusion angle of substantially all the reflected light rays from the reflection surface which are to be outputted through the second region.

2. The vehicular lamp according to claim 1, wherein the lens cut including the first region and the second region is provided in an area of the front surface through which light rays from the light source which travel relatively long in the lens body are outputted.

3. The vehicular lamp according to claim 2, wherein
the first region is configured to diffuse the direct light rays from the light source by a first angle in a vertical direction and by a second angle in a horizontal direction, and
the second region is configured to diffuse the reflected light rays from the reflection surface by the first angle in the vertical direction and by the second angle in the horizontal direction.

4. The vehicular lamp according to claim 2, wherein
the vehicular lamp is configured for attachment to a vehicle and the light source has an optical axis that coincides with a reference axis extending in a front-rear direction of the vehicle,
the front surface includes a first light-outputting surface that linearly extends in a first direction in a front view, and a second light-outputting surface that linearly extends in a second direction in a front view,
the rear surface includes a first light-entering surface that linearly extends in the first direction in a front view, and a second light-entering surface that linearly extends in the second direction,
the first light-entering surface and the second light-entering surface are disposed in such a state as being opened in a V shape toward the front as seen in a side view,
an inclination angle of the first light-entering surface with respect to a vertical line is adjusted so that light rays from the light source entering the lens body through the first light-entering surface are outputted through an entire area of the first light-outputting surface,
an inclination angle of the second light-entering surface with respect to the vertical line is adjusted so that light rays from the light source entering the lens body through the second light-entering surface are outputted through an entire area of the second light-outputting surface,
the first light-outputting surface and the second light-outputting surface are configured to have a bent shape as a whole,
the first light-entering surface and the second light-entering surface are configured to have a bent shape as a whole, and
the light rays from the light source enter the lens body 20 through the rear surface, and are condensed in a thickness direction of the lens body by the rear surface as light rays parallel to left and right side surfaces of the lens body.

5. The vehicular lamp according to claim 1, wherein the second light-entering surface is configured to be shorter than the second-light outputting surface as seen in a side view.

6. The vehicular lamp according to claim 2, wherein the second light-entering surface is configured to be shorter than the second-light outputting surface as seen in a side view.

7. The vehicular lamp according to claim 3, wherein the second light-entering surface is configured to be shorter than the second-light outputting surface as seen in a side view.

8. The vehicular lamp according to claim 4, wherein the second light-entering surface is configured to be shorter than the second-light outputting surface as seen in a side view.

9. The vehicular lamp according to claim 1, wherein
the first light-outputting surface is disposed above the reference axis and the second light-outputting surface is disposed below the reference axis, and
the first light-entering surface is disposed above the reference axis and the second light-entering surface is disposed below the reference axis.

10. The vehicular lamp according to claim 2, wherein
the front surface is disposed in a state of being opened in a V shape toward a front as seen in a side view,
the second light-outputting surface extends more forward and downward than a distal end portion of the first light-outputting surface, and
the lens body includes a lower surface including a reflection surface.

11. The vehicular lamp according to claim 1, wherein the lens body includes an intermediate cross-sectional shape between the rear surface and the front surface of the lens body, and the intermediate cross-sectional shape includes a first cross-sectional shape that linearly extends in the first direction and a second cross-sectional shape that linearly extends in the second direction to be a bent shape as a whole.

12. The vehicular lamp according to claim 1, wherein
the plurality of lens cuts include a plurality of first lens cuts and a plurality of second lens cuts,
the plurality of first lens cuts are configured to diffuse light rays from the light source, which are to be outputted through the first lens cuts, by a first angle in a vertical direction and by a second angle in a horizontal direction,
the plurality of second lens cuts are configured to diffuse the light rays from the light source, which are to be outputted through the second lens cuts, by a third angle smaller than the first angle in the vertical direction and in the horizontal direction by a fourth angle larger than the second angle, and
the first lens cuts and the second lens cuts are alternately arranged in a checkerboard pattern so that the same type lens cuts are not adjacent to each other.

13. The vehicular lamp according to claim 1, wherein
the front surface includes a plurality of lens cut rows constituted by the plurality of first lens cuts and the plurality of second lens cuts, and
the lens cut row on a more inner side of the vehicle out of the plurality of lens cut rows is arranged more forward.

14. The vehicular lamp according to claim 1, wherein
the first region is configured to diffuse the direct light rays from the light source by a first angle in a vertical direction and by a second angle in a horizontal direction, and
the second region is configured to diffuse the reflected light rays from the reflection surface by the first angle in the vertical direction and by the second angle in the horizontal direction.

15. The vehicular lamp according to claim 1, wherein
the vehicular lamp is configured for attachment to a vehicle and the light source has an optical axis that coincides with a reference axis extending in a front-rear direction of the vehicle,
the front surface includes a first light-outputting surface that linearly extends in a first direction in a front view, and a second light-outputting surface that linearly extends in a second direction in a front view, the rear surface includes a first light-entering surface that linearly extends in the first direction in a front view, and a second light-entering surface that linearly extends in the second direction, the first light-entering surface and the second light-entering surface are disposed in such a state as being opened in a V shape toward the front as seen in a side view, an inclination angle of the first light-entering surface with respect to a vertical line is adjusted so that light rays from the light source entering the lens body through the first light-entering surface are outputted through an entire area of the first light-outputting surface, an inclination angle of the second light-entering surface with respect to the vertical line is adjusted so that light rays from the light source entering the lens body through the second light-entering surface are outputted through an entire area of the second light-outputting surface, the first light-outputting surface and the second light-outputting surface are configured to have a bent shape as a whole, the first light-entering surface and the second light-entering surface are configured to have a bent shape as a whole, and the light rays from the light source enter the lens body through the rear surface, and are condensed in a thickness direction of the lens body by the rear surface as light rays parallel to left and right side surfaces of the lens body.

* * * * *